Oct. 29, 1935.  P. B. BRILL ET AL  2,018,911
COMPOSITE CONSTRUCTION MATERIAL AND METHOD OF MAKING THE SAME
Filed June 29, 1934  2 Sheets-Sheet 1

Inventors:
Philip B. Brill
George H. Ellis
By N. F. Woodward
atty

Oct. 29, 1935. P. B. BRILL ET AL 2,018,911
COMPOSITE CONSTRUCTION MATERIAL AND METHOD OF MAKING THE SAME
Filed June 29, 1934   2 Sheets-Sheet 2

Inventors:
Philip B. Brill
George H Ellis
By H. F. Woodward
atty

Patented Oct. 29, 1935

2,018,911

UNITED STATES PATENT OFFICE 2,018,911

COMPOSITE CONSTRUCTION MATERIAL AND METHOD OF MAKING THE SAME

Philip B. Brill, New Haven, Conn., and George H. Ellis, St. Paul, Minn., assignors to The Insulite Company, Minneapolis, Minn., a corporation of Minnesota Application June 29, 1934, Serial No. 733,078

11 Claims. (Cl. 72—68)

This invention relates to partition or panel structures which are made up of a plurality of sections whose meeting edges are adapted to be concealed by pilasters. The sections and the pilasters being so interlocked as to permit the same to be not only readily assembled by to also permit them to be disassembled.

One object of the present invention is to provide a sectional partition wherein the same elements could serve to lock the pilasters to the meeting edges of the two sections, also serve the purpose of locking said two sections together.

Another object of the invention is to provide a partition post which may be used between partition pieces to effectively hold the same together and to reduce the length of time necessary in the erection of partitions in rooms having ceilings of various heights.

Another object of the invention is to produce a heat insulating structural material from a core of woody fibers and particularly a composition core with heat insulating qualities and a surface layer or layers of material, preferably sheet steel. The layers of metal being secured in place by a cementitious material that will cause a thorough and secure adhesion and a substantially inseparable union between the composition board and the metal over all the parts of the cemented surface to be procured.

In the preferred construction of the heat insulating structural material there is employed a core of "Insulite" which has been treated with a fireproofing material and an insecticide and fungi resisting material, and a surface layer or layers of steel which are cemented to said core by the use of a casein adhesive.

A composition material formed in accordance with this invention will possess heat insulating properties of a high degree, the core of which will be permanent in character and will not disintegrate under vibration and the composite structure will possess great structural strength, lightness in weight, durability, hardness of surface, and fungi and termite resisting qualities. Such material may be used in the building up of panels for use in the walls of state rooms on boats and for the walls of refrigerator railway cars, refrigerator plants, refrigerator shipping boxes, and other similar refrigerating structures designed to prevent the transmission of heat to or from goods transported and stored therein and for many other uses.

To enable others skilled in the art to fully comprehend the underlying features of the invention that they may embody the same in various modifications and structure and relationship contemplated drawings depicting preferred forms have been annexed as a part of this disclosure and in such drawings, similar reference characters denote corresponding parts throughout all the views of which, Fig. 1 is a disassembled view of one form of the pilaster and the metal clad insulating material.

When forming the core sheet from wood or woody fibers there is incorporated in the pulp before the sheet is formed termite, fungi and fire resisting materials. If desired water proofing material also may be added so that the final product will be highly resistant to the absorption of moisture. Of course, it is to be understood that the water proofing and fire proofing materials may be added after the sheet is formed.

Figure 1:
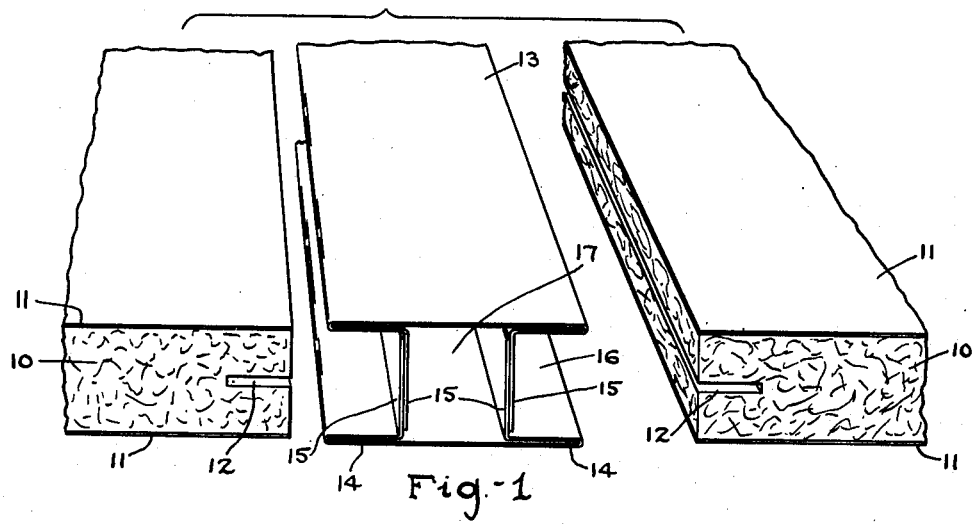

Referring to Fig. 1 the core sheets are indicated at 10. After the core sheets 10 have been formed they are coated with a suitable adhesive, preferably a casein adhesive, and then the surface plates 11, of thin metal are applied to the core sheets. To insure a secure bonding between the core sheet and the surface plates the composite sheet is subjected to pressure or to heat and pressure. The pressure is not sufficient to materially reduce the insulation value of the core sheets. Along the longitudinal edges of the sheet are formed kerfs 12, the object of which will be described later.

Figure 2:
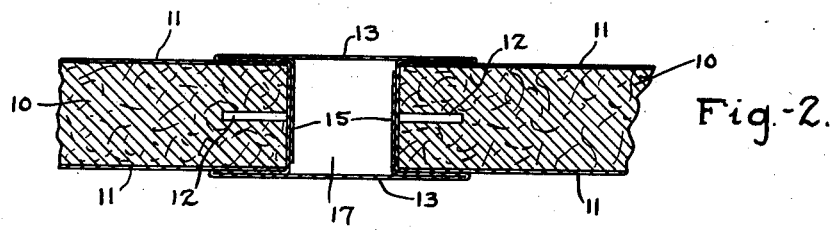
Fig. 2 is an assembled view of a modified form.
Figure 3:
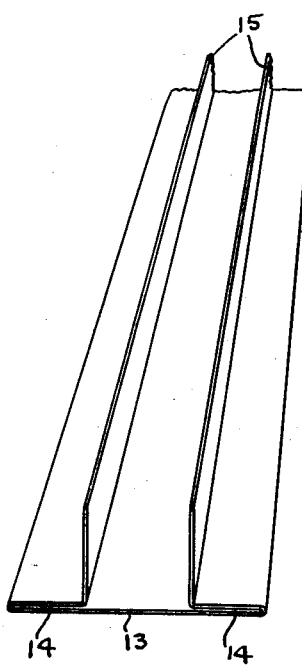
Fig. 3 is a perspective view of a part of one of the pilasters.

The pilasters may be formed in any desired manner but it is preferred that they be of the type shown in Figure 1 or 2. In Figure 1 the pilasters consist of two or more sheets of relatively thin metal, or similar material, having a flat surface 13, and bent so as to form channel-like members 16. The channel-like members being flanked by a double portion of the metal at 14, which is so arranged that certain amount of elasticity is provided. The free ends or tongue members 15 are so arranged that one extends inside of the longitudinally extending opening while the other extends on the outside thereof. In the form disclosed in Fig. 1 at least one of the tongue members extends entirely across channel member form and this insures relatively strong bracing means.

Figure 4:
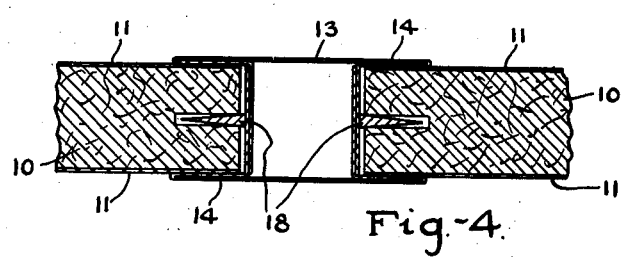
Fig. 4 is a modified form of the construction shown in Fig. 1.

The pilaster member disclosed in Fig. 2, the tongue members do not extend entirely across the channel members. In Fig. 4 is shown a modified form of construction in which a wedge like member 16 is adapted to be inserted in the kerfs 12. The wedge like members preferably are a separate unit but it may be formed in the channel member integral with the pilaster.

In assembling the metal clad panels and the pilasters the edge to be inserted into a channel of the pilasters is forced together so as to partially close the kerf 12. The metal clad panel is inserted into the channel and the edges spring back to the original position, thus securely locking the panel in place. To insure a closer locking means between the pilasters and the metal clad sheets wedge 16 may be inserted in kerfs 12. When the metal clad panels are inserted into the channel members of the pilasters the wedge members are forced into the kerf and expand the insert part of the panels, thus securely locking them in place.

Figure 5:
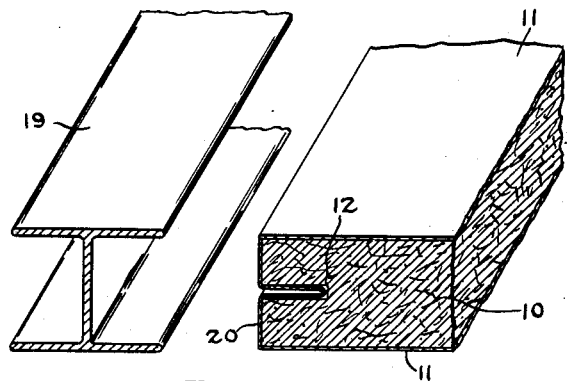
Fig. 5 is a disassembled view of another form of a pilaster and the metal clad insulating material.
Figure 6:
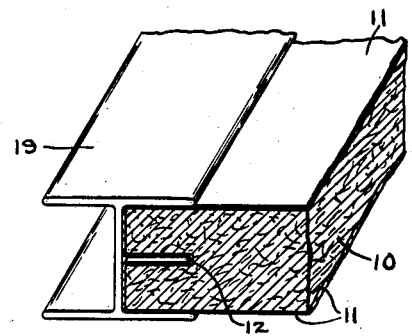
Fig. 6 is an assembled view of the same.

In Figure 5 is shown another form of pilaster 19 and a modified form of wedge which entirely covers the edges of the core sheet. The core sheet 10 has the metal faces 11 secured thereto by any suitable means and a kerf 12 extending along the edges of the core sheet. When the form of the wedge is used as shown in Figure 5 it is necessary that the face plates 11 project slightly beyond the edges of the core sheet 10. This permits the face plate or extending wing portions of the wedge 20 to abut evenly against the core sheet and gives an insulating material which is wholly incased with metal.

When a wedge member, as disclosed in Figures 5 to 9, is utilized the substantially V shaped portion of the wedge member is inserted into the kerf formed on the edges of the core sheet and when the core sheet is forced into the channel members of the pilasters the wedge members expand the edges of the composite sheet, thus securely locking them in place in the pilasters.

Figure 7:
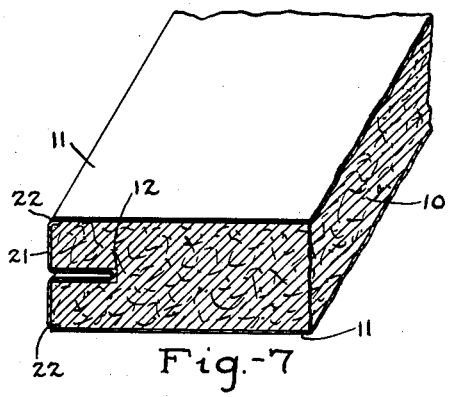
Fig. 7 is a view of a sheet of metal clad insulating material showing modified form having a wedge in the kerf.
Figure 8:
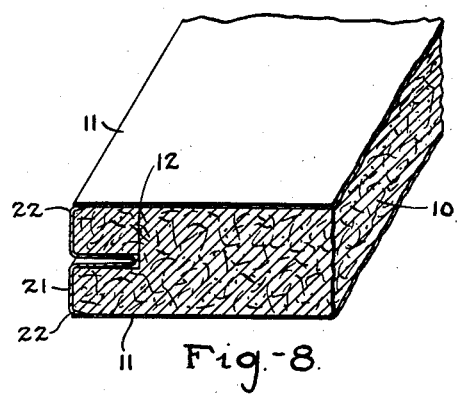
Figure 8 is a view of a composite panel having a modified form of wedge in the kerf.
Figure 9:
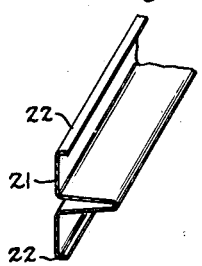
Fig. 9 is a view of the wedge disclosed in Fig. 7.

In Figures 7 and 8 is shown another modified form of wedges. If used it is unnecessary that the face plates 11 project beyond the edge of the core sheet. This is possible due to the fact that the wedges 21 have their outer edges 22 turned at an angle which is substantially parallel with the V shaped portion of the wedge. The wing portions of the wedges 21 are forced into the core sheet by sufficient application of pressure, but such pressure not being sufficient to disrupt the bond between the metal face sheets and the core. The form of wedge disclosed in Figure 8 has the portions 22 tapered so as to provide a relatively sharp entering member, so as to facilitate the wedges in entering the core sheet.

It is possible when the form of wedges used as disclosed in Figures 7 and 8 to weld the wedge members to the face plates and this may be accomplished by any suitable means desired. The term "fire proof material" as referred to herein is intended to include any suitable material that will answer the purpose intended and such a material that has been found to be highly satisfactory is a specially treated vermiculite.

When using a wedge of the type disclosed by Figures 5 to 9 it has often been found desirable to also use a wedge of the type disclosed in Figure 4 in combination therewith to secure a better locking of the panel in the pilasters.

What we claim is:

1. In combination with the composite structural material including a core of pulped vegetable material, having kerfs along the edges, metal surface sheets secured by a cementitious medium, and wedge-like members adapted to be inserted in a plaster formed from at least two sheets of metal bent to form two channel members for the reception of the composite sheets and an opening between said channel members whereby a passage is provided for electrical conductors.

2. In a wall structure including composite panel members having high heat insulating characteristics, kerfs extending along at least two edges of said composite panels, pilasters provided with channels for the reception of the composite panels and means for spreading the edges of the kerfs to securely lock the composite panels in the pilasters.

3. In a wall structure composite panels formed from a core of pulped vegetable material and metal surface plates secured to the core, kerfs extending along the edges of said composite panel, pilasters for the reception of the edges of said composite panel and means for locking the composite sheets and the pilaster into a unitary structure.

4. In combination with composite panels having kerfs extending along at least one edge of each panel, pilasters for receiving the edges of said composite panels and means for entering the kerfs and locking the edges of the composite panels and the pilasters together.

5. In combination with a composite structural panel, pilasters for receiving the edges of said composite panel and means on said pilasters for spreading the edges of said composite panel to securely lock said panel and pilasters together.

6. In combination with composite panels having kerfs extending along at least two edges thereof, pilasters for receiving the edges of said composite panels and means on said pilasters for spreading the edges of said composite panels for locking the panels and the pilasters together.

7. A composite structural unit formed from a core of pulped ligno-cellulose material, surface plates of metal flanking the said core on opposite sides, a casein cementing medium securing the core and the surface plates together, and kerfs extending along at least two edges of said composite material.

8. A fireproof, sound adsorptive, composite, structural unit comprising a core of pulped vegetable material treated with a fire-proofing solution, surface plates of metal flanking said core on opposite sides, a cementing medium securing the core and the surface plates together, kerfs extending along the edges of said core sheet, and metal wedge members in said kerfs.

9. A fireproof, sound adsorptive, composite panel comprising a core of pulped vegetable material treated with a fire resisting vermiculite material of a character that upon being subjected to high temperature generates gas in quantities less than will disrupt the panel, surface plates of metal adhesively secured to the core, and kerfs extending along at least two edges of the said core.

10. In combination with pilasters provided with channels for the reception of edges of composite panels, of panels consisting of homogeneous cores of pulped vegetable material, surface plates of metal adhesively secured to said core, and kerfs extending along at least two edges of said core.

11. A composite structural material formed from a core of pulped ligno-cellulose material, surface plates of metal flanking the core on opposite sides, means for securing the surface plates to the core sheet, kerfs extending along the edges of said core sheet and metal wedge members in said kerfs, said wedges having wing portions covering the edges of the core sheet.

PHILIP B. BRILL.
GEORGE H. ELLIS.